J. B. COOLEY.
COFFEE POT.
APPLICATION FILED MAY 2, 1917.
1,276,177.
Patented Aug. 20, 1918.
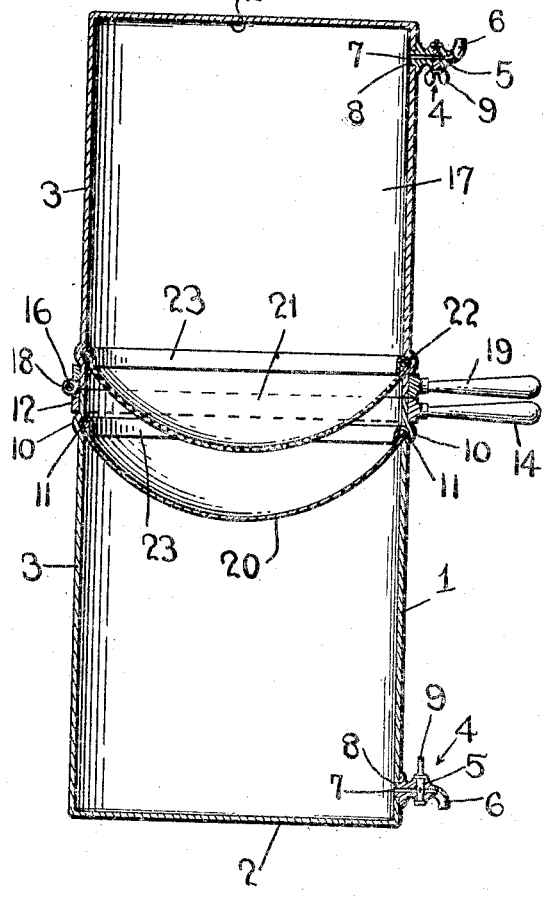
Fig_1_
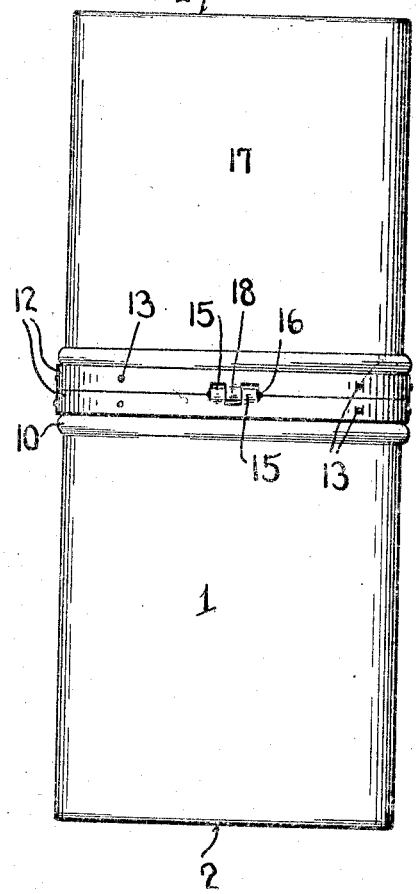
Fig_2_
WITNESSES
L. B. James
Frank W. O'Connell
INVENTOR
James B. Cooley
BY
ATTORNEY

UNITED STATES PATENT OFFICE.

JAMES B. COOLEY, OF BATH, NEW YORK.

COFFEE-POT.

1,276,177.

Specification of Letters Patent. Patented Aug. 20, 1918.

Application filed May 2, 1917. Serial No. 165,985.

*To all whom it may concern:*

Be it known that I, JAMES B. COOLEY, a citizen of the United States, residing at Bath, in the county of Steuben and State of New York, have invented certain new and useful Improvements in Coffee-Pots, of which the following is a specification.

This invention has reference to cooking utensils and more particularly to such as are adapted for the brewing of coffee.

This invention has for its principal object the production of a coffee-pot wherein the liquid may be passed from one end to the other thereof, as many times as desired through a bag containing the coffee, by the reversing of the coffee pot, thereby extracting the coffee qualities without allowing the coffee grounds to soak in the water or exposing the liquid to the atmosphere during the process.

A further object is the production of a utensil of the character described comprising a pair of separable receptacle sections, adapted to be arranged in superposed relation and provided each with separate bag means for securely retaining such coffee as may be deposited therein, suitable fastening means being provided for holding said receptacle sections in place.

With the above and other objects in view, my invention consists in the novel details of construction, arrangement and combination of parts as will be hereinafter more fully referred to and described in the following specification and pointed out in the drawings, wherein:—

Figure 1 is a vertical sectional view of the coffee-pot, illustrating the interior thereof and showing the manner in which the coffee bags are arranged, and Fig. 2 is a view in side elevation, portraying the manner in which the sections of the device are joined together.

In carrying out my invention, I provide a section comprising the bottom piece 2 and the cylindrical surrounding wall 3. This section is adapted to contain the boiling water ordinarily used in brewing coffee and is provided with faucet means 4 adjacent the bottom 2 thereof for dispensing beverage therefrom.

This faucet means comprises a faucet body 5 provided with a nozzle 6 and an outlet passage 7 leading thereto. By means of a threaded shank 8 the faucet is securely fastened to the cylindrical wall of the section and is further provided with a suitable valve means 9 for regulating the discharge of the beverage from the container.

Spaced slightly from the upper open end of the section and extending circumferentially about the cylindrical wall is an annular humped projection 10, formed by an outward depression of the cylindrical wall 3, thereby providing a groove 11 upon the inner face thereof as shown. An annular band 12 is secured, by means of rivets or other suitable fastening means 13, about the section between the upper edge thereof and the humped portion 10 and carries a handle 14 which projects outwardly from the cylindrical wall of the section. Upon the opposite side to that from which the handle 14 extends, the band 12 is provided with a pair of spaced knuckles forming part of a hinge joint and provided each with an eye-opening for the reception therein of the pintle 16.

The section 1 has associated therewith a second section 17, the latter being practically a duplicate of the former and constituting, when connected thereto, an extension of the same. The mating sections 1 and 17 are adapted to be connected to each other at their open ends so as to comprise but one receptacle or container; and in order that they may be retained in close relative engagement, the annular band 12 of the upper section 17 is provided with a single knuckle 18, adapted for insertion between the spaced knuckles 15 of the lower section 1, to which it is hingedly connected by means of the pintle 16 previously referred to. The handle 19 of the upper band 12 is also positioned thereon so that when the sections are closed, it will be directly over the handle of the lower section whereby both handles may be gripped by one and the same hand for further retaining the sections in close engagement and also for reversing the position of the sections so that the boiling water therein may be caused to pass from one section to the other, for the purpose hereinafter set forth.

The sections 1 and 17 are provided with bag means 20 and 21 respectively, between which the coffee is deposited. These bags, which may be formed of suitable cloth material, are provided with flexible support rings 22 about which the ends 23 of the bags are sewed or otherwise fastened. These bags are positioned within the mouths of the sections and are suspended therefrom in a removable manner, the ring 22 of each bag being adapted for reception within the groove 11 of its section. It will be noted that the bag 21 of the upper section depends into the mouth of the lower section so that upon reversing the receptacle the coffee will be transferred from the bag 20 to the other bag 21, which will then be forced backward into its own section 17. This operation should be repeated several times.

After the parts have been assembled in the manner above described and the water contained therein has reached the boiling point, the upper section 17 may be swung back by its handle 19 to permit the coffee to be deposited in the bag 20 of the lower section 1. After this has been done the two handle members may be gripped to hold the sections in close leak-proof relation whereupon the entire receptacle is then reversed as many times as desired. The purpose of this is to enable the liquid to pass from one section to the other through the bags containing the coffee, thereby extracting the properties of strength and flavor from the coffee without allowing the coffee grounds to soak in the water or exposing the liquid to the atmosphere during the operation of brewing the coffee.

It will therefore be seen that in this novel and improved form of coffee pot the coffee grounds are kept separate from the water, except while brewing and consequently the absorption of the undesirable elements of the coffee grounds is prevented. An excellent quality of beverage can also be brewed in this device since none of the properties of the coffee are lost by evaporation, while on the other hand the cloth bags permit the use of pulverized or even powdered coffee, thereby effecting considerable saving, as the finer the coffee is ground the lesser amount is required to get the desired strength and flavor.

Having thus fully described my invention, what I claim as new and desire to secure by Letters Patent, is:—

The herein described coffee pot comprising mating cup-shaped sections having grooves in their walls adjacent their open ends, bands secured around said walls adjacent the grooves, a hinge connecting said bands at one point, and handles projecting from said bands at a point diametrically opposite the hinge; combined with spring rings for insertion in said grooves, fabric bags carried by said rings respectively, and a manually controlled outlet from each section.

In testimony whereof I affix my signature in presence of two witnesses.

JAMES B. COOLEY.

Witnesses:
W. S. DRAKE,
JOHN F. CLARK.

Copies of this patent may be obtained for five cents each, by addressing the "Commissioner of Patents, Washington, D. C."